UNITED STATES PATENT OFFICE.

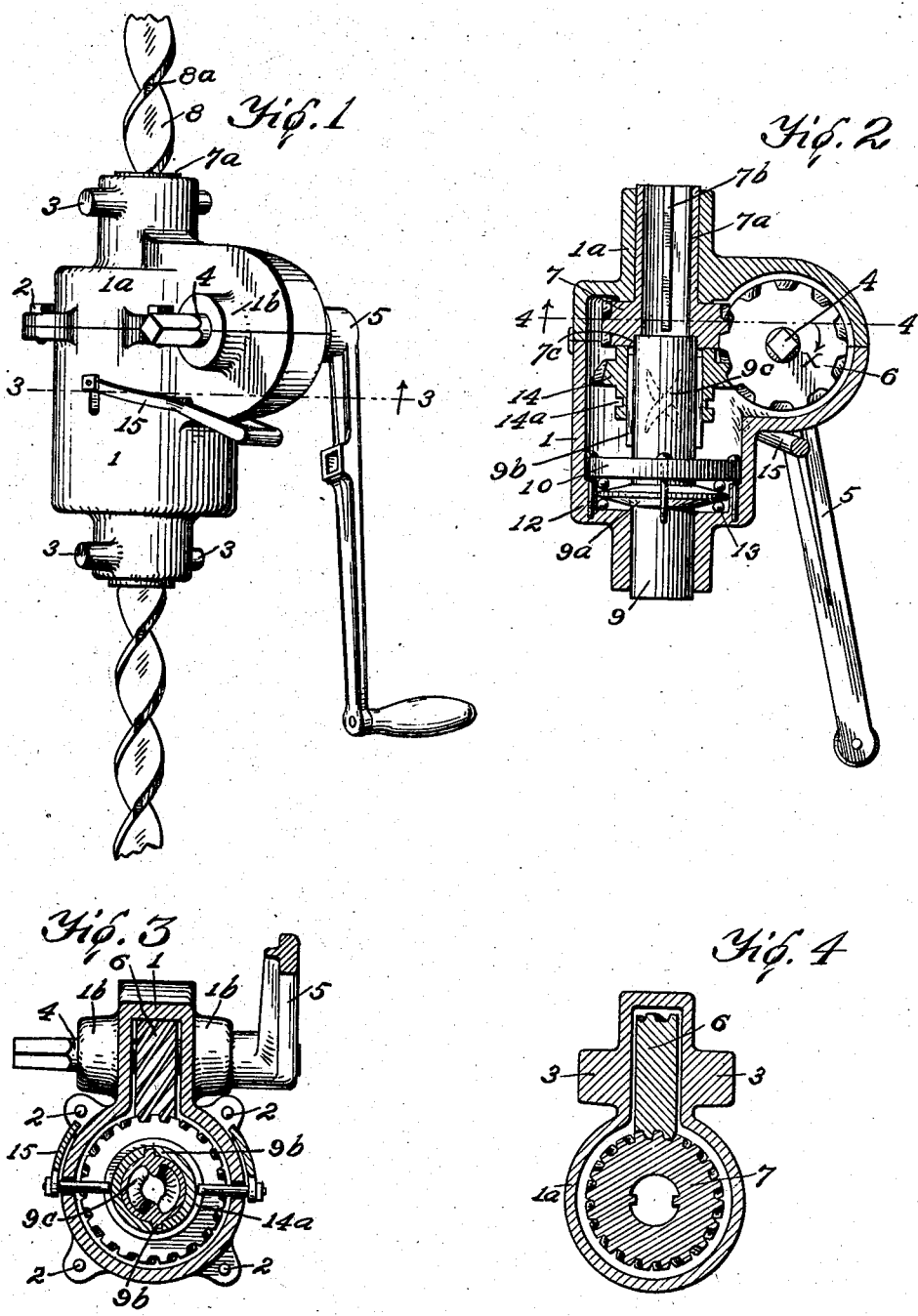

JACOB BLESER, OF SPRINGFIELD, ILLINOIS.

MINER'S DRILL.

No. 894,808.  Specification of Letters Patent.  Patented Aug. 4, 1908.

Application filed July 31, 1906, Serial No. 328,515. Renewed November 27, 1907. Serial No. 404,053.

*To all whom it may concern:*

Be it known that I, JACOB BLESER, a citizen of the United States, residing at Springfield, in the county of Sangamon and State of Illinois, have invented certain new and useful Improvements in Miners' Drills, of which the following is such a full, clear, and exact description as will enable others skilled in the art to which it appertains to make and use my said invention.

My invention relates to drills such as are used by miners for drilling holes in coal or other minerals to be mined, and relates particularly to that class of drills in which augers are used to drill the hole and remove the borings from the drilled hole.

The purposes of my invention are to provide a housing of improved construction; to provide means for turning the auger and cooperating means for advancing the auger into the material being bored at a normal speed due to the twist of the auger; to provide means to facilitate the withdrawal of the auger; to provide ball-bearings of improved construction; to provide improved means for bringing the auger into or out of action and to provide other novel features of construction hereinafter set forth.

With these ends in view, my invention consists in the novel features of construction and combinations of parts shown in the annexed drawings, to which reference is hereby made, and hereinafter particularly described and finally recited in the claims.

Referring to the drawings, in which similar reference numerals designate like parts in the several views; Figure 1 is a perspective view of the complete machine; Fig. 2 is a longitudinal, axial section, the auger being omitted; Fig. 3 is a vertical transverse section on the line 3. 3. of Fig. 1; and Fig. 4 is a vertical transverse section on the line 4. 4. of Fig. 2.

The metal housing consists of members 1 and $1^a$ connected together by screws 2, or equivalents. On the members 1 and $1^a$ are trunnions adapted to support the housing on any suitable frame. A shaft 4, turns in bearings $1^b$ on the housing and has squared parts accommodating a crank 5, for turning the shaft. A worm wheel 6 is secured on and turns with the shaft 4. A worm pinion 7 meshes with and is driven by the worm wheel 6 and has an elongated hub $7^a$ turning in the annular extension of the member $1^a$; it also has an internal longitudinal feather $7^b$ fitting in a longitudinal channel $8^a$ in the auger 8. The pinion 7 has a circular recess $7^c$ accommodating one end of a tubular shaft 9, and has one tooth more than the pinion 14. The tubular shaft 9 has an integral circumferential ledge $9^a$ and longitudinal feathers $9^b$; it also has internal spiral members $9^c$ conforming to the twist of the auger. The tubular shaft 9 turns in the recess $7^c$ and the annular extension of the member 1. A circular plate 10 incloses the shaft 9 and is connected with the member 1 by screws 12. Balls 13 between the plate 10 and the ledge $9^a$ and between the ledge $9^a$ and the member 1 serve to reduce the friction of the revolving shaft. A worm pinion 14 is slidable on the shaft 9 and meshes with and is driven by the worm wheel 6. A yoke 15 oscillative on the member 1, fits in a circumferential groove $14^a$ in the hub of the pinion 14 and serves to slide the pinion on the shaft 9, guided by the feathers $9^b$, into or out of mesh with the worm wheel 6.

The operation of the mechanism is as follows: Owing to the difference in speed of the pinions 7 and 14 the faster turning of the pinion 14 causes the members $9^c$ to act on the auger to propel the auger forward through the hub $7^a$. If the parts be in the position shown in Fig. 2 and the auger be in place as shown in Fig. 1, and if the crank 5 be turned to turn the worm wheel 6 in the direction indicated by the arrow X, the wheel 6 will drive the pinions 7 and 14 both in the same direction. The turning of the pinion 7 will turn the auger 8 through the instrumentality of the feather $7^b$ fitting in the channel $8^a$ and the turning of the pinion 14 will cause the turning of the tubular shaft 9 through the instrumentality of the feathers $9^b$; and the turning of the shaft 9 will cause longitudinal movement of the auger by reason of the members $9^c$ running in the spiral groove of the auger 8. If it be desired to withdraw the auger from the bored hole, the yoke 15 will be used to slide the pinion 14 on the shaft 9 and disengage the pinion from the worm wheel 6. The auger may then be withdrawn by merely pulling on the auger and the longitudinal movement of the auger will cause rotation of the shaft 9 and connected pinion 14, the turning of the shaft being facilitated by the ball-bearings already described.

Having fully described my invention, what I claim as new and desire to secure by Letters Patent is:

1. In a miner's drill the combination of a housing comprising separable members each having a tubular extension, a worm wheel revoluble in the housing, a tubular shaft revoluble in the housing and having internal members conforming to the twist of the auger, a worm pinion meshing with the worm wheel and in line with the tubular shaft and having a tubular hub provided with a feather adapted to fit in a longitudinal channel in the auger, an auger fitting in the tubular shaft and the tubular hub of the pinion and having a longitudinal channel fitting the feather in the hub of the pinion, and a worm pinion slidable on the tubular shaft and meshing with the worm wheel.

2. In a miner's drill the combination of a housing, a worm wheel revoluble in the housing, a tubular shaft revoluble in the housing and having internal members conforming to the twist of the auger, a worm pinion meshing with the worm wheel and in line with the tubular shaft and provided with an internal feather fitting a longitudinal channel in the auger, an auger fitting in the tubular shaft and having a longitudinal channel fitting the internal feather of the pinion, a worm pinion slidable on the tubular shaft and meshing with the worm wheel and means for disengaging said last named pinion from the worm wheel.

3. The combination of a cylindrical housing having an end wall, a shaft revoluble in the housing and having a ledge, a fixed circular plate surrounding the shaft and balls fitted to run on the surfaces of the ledge of the shaft and in contact with the circular plate and the end wall of the housing.

4. The combination of a housing, a tubular shaft revoluble in the housing and having internal members conforming to the twist of an auger, a pinion slidable on said tubular shaft, a pinion in line with said tubular shaft and having an internal feather, an auger fitting in said tubular shaft and having a longitudinal channel matching the feather of said last named pinion and a worm wheel meshing with and driving both of said pinions.

5. The combination of a housing, a tubular shaft revoluble in the housing and having internal members conforming to the twist of an auger, ball-bearings interposed between the housing and the tubular shaft, a pinion slidable on said tubular shaft, a pinion in line with said tubular shaft and having an internal feather, an auger fitting in said tubular shaft and having a longitudinal channel matching the feather of said last named pinion, and a worm wheel meshing with and driving both of said pinions.

6. The combination of a housing, a tubular shaft revoluble in the housing and having internal members conforming to the twist of an auger, ball-bearings interposed between the housing and the tubular shaft, a pinion slidable on the tubular shaft, a revoluble pinion in line with the tubular shaft and having an internal feather, an auger fitting in said tubular shaft and having a longitudinal channel matching the feather of said last named pinion, a worm wheel meshing with and driving both pinions and means for disengaging the slidable pinion from the worm wheel.

7. In a miner's drill the combination of a housing, a worm wheel revoluble in the housing, a tubular shaft revoluble in the housing and having internal members conforming to the twist of the auger, a worm pinion meshing with the worm-wheel and in line with the tubular shaft and provided with an internal feather fitting a longitudinal channel in the auger, an auger fitting in the tubular shaft and having a longitudinal channel fitting the internal feather of the pinion, a worm-pinion mounted on the tubular shaft and meshing with the worm-wheel and means for disengaging said last named pinion from the worm wheel.

In witness whereof I have hereunto subscribed my name at Springfield, Illinois, this 28th day of June, 1906.

JACOB BLESER.

Witnesses:
E. H. LICHTENBERG,
O. A. MERKEL.